Patented Mar. 18, 1930

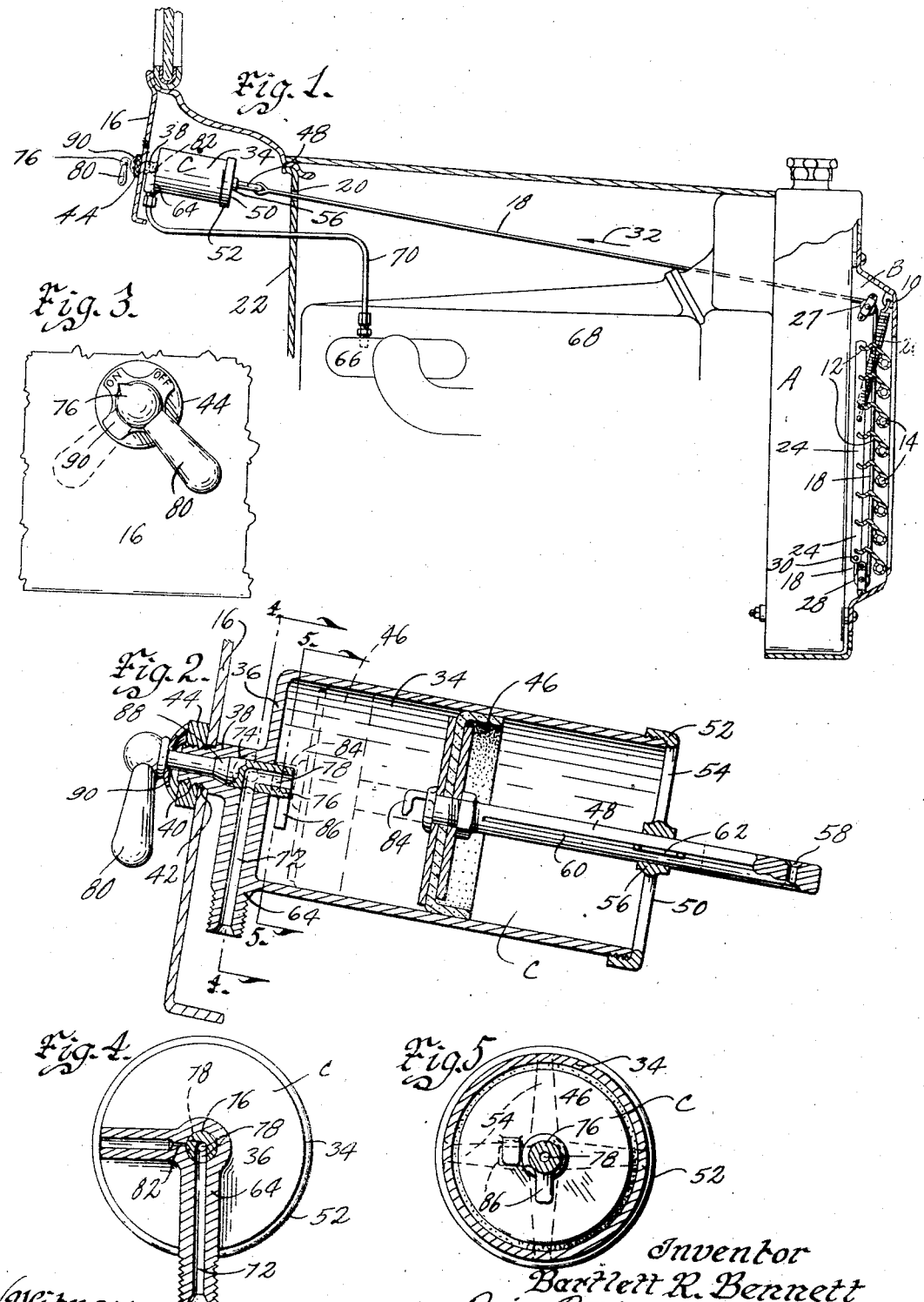

1,750,618

UNITED STATES PATENT OFFICE

BARTLETT R. BENNETT, OF MINEOLA, NEW YORK

RADIATOR-SHUTTER-CONTROL STRUCTURE

Application filed July 2, 1928. Serial No. 289,947.

The object of my invention is to provide a radiator shutter control structure of simple, durable and comparatively inexpensive construction.

Another object of my invention is to provide a control structure for the radiator shutters of automobiles wherein the vacuum caused by the motor is utilized for operating the shutter for keeping it open while the engine is running and for allowing it to close when the engine stops.

More particularly it is my object to provide in connection with the radiator shutter blades, a piston operatively connected to them and movable within a cylinder, the cylinder being in communication with the intake manifold or vacuum tank line of an automobile.

Still a further object is to provide in connection with the cylinder, a valve whereby the piston can be selectively caused to be operated upon by the vacuum of the engine or allowed to move to an inoperative position due to a spring which normally closes the shutter blades.

Still a further object is to provide coacting means on the valve and the piston whereby the piston can be locked in a predetermined position.

With these and other objects in view my invention consists in the construction, arrangement and combination of the various parts of my device, whereby the objects contemplated are attained, as hereinafter more fully set forth, pointed out in my claims, and illustrated in the accompanying drawings, in which:

Figure 1 is a cross sectional view of a portion of an automobile illustrating the instrument panel, dash or engine board, radiator and radiator shutter in section.

Figure 2 is an enlarged vertical longitudinal sectional view through the cylinder, piston and valve of my control structure.

Figure 3 is an end elevation of the valve showing it as it appears attached to the instrument panel of the automobile.

Figure 4 is a sectional view on the line 4—4 of Figure 2; and

Figure 5 is a sectional view on the line 5—5 of Figure 2.

On the accompanying drawings, I have used the reference character A to indicate generally the radiator of an automobile. A radiator shutter structure B is secured to the front of the radiator and consists of a housing 10 having a plurality of shutter blades 12 pivotally mounted therein on the axes 14. A shutter control structure C is mounted on the instrument panel 16 of the automobile and is connected by a flexible cable or wire 18 to the shutter blades 12. The wire 18 extends through an opening 20 formed in the dash or engine board 22 of the automobile.

A control bar 24 is pivotally connected to each shutter blade 12 and is normally constrained to move upwardly by a spring 26 which serves to normally maintain the blades in closed position. The wire 18 extends over a pulley 27 secured to the side of the housing 10 and then extends downwardly and around a pulley 28. The wire then extends upwardly and is connected at 30 to the control bar 24 whereby movement of the wire 18 in the direction of the arrow 32 will pull the control bar 24 downwardly against the action of the spring 26 as will be obvious from the construction of the parts thus far described.

The control structure C consists of a cylinder 34 having a head 36. The head 36 has thereon a boss 38 which is reduced and screw threaded as indicated at 40 for extending through an opening 42 in the instrument panel 16.

A nut 44 is positioned on the threaded portion 40 of the boss 38 and serves to hold the cylinder 34 in assembled relationship to the instrument panel 16. A piston 46 is slidably mounted within the cylinder 34 and is secured to a piston rod 48 which slidably extends through an end cap 50. The end cap 50 consists of an outer rim 52 in threaded engagement with the open end of the cylinder 34 or otherwise secured thereto. Spokes 54 extend inwardly from the rim 52 and serve to support a hub 56 through which the piston rod 48 slidably extends.

An opening 58 is provided in the outer end of the piston rod 48 to receive the end of the wire 18 whereby movement of the piston rod serves to control the shutter blades 12. The piston 46 is prevented from turning by means of a keyway 60 and a key 62 fixed relative to the hub 56. The purpose of the construction just described will hereinafter be described.

A boss 64 is formed on the cylinder 34 and serves to connect the cylinder 34 with the intake manifold 66 of the automobile engine 68 through the medium of a small tube 70. The tube 70 is preferably of copper and the fittings at its ends are of standard construction. Instead of connecting to the intake manifold 66, a T-connection can be inserted in the vacuum line of the automobile and the tube 70 connected into such a T.

The boss 64 is provided with an opening 72 extending inwardly from the tube 70 to a central opening 74 formed in the boss 38. A valve stem 76 is rotatably mounted in the opening 74 and is provided with an L-shaped passageway 78 whereby when the valve operating handle 80 is in the position illustrated in Figure 2 and in full lines in Figure 3, the passage 78 will serve to connect the opening 72 with the interior of the cylinder 34. When the handle 80 is turned a quarter turn to the dotted line position shown in Figure 3, the passageway 78 will communicate to the atmosphere through a pin hole opening 82 shown in Figure 4 of the drawings.

When the handle 80 is in the on position indicated in Figure 3, the vacuum created in the intake manifold 66 will touch the piston 46 to move inwardly relative to the cylinder 34 for opening the shutter blades 12. When the engine stops, the piston 46 will gradually move in an opposite direction because the vacuum would not be one hundred percent and it would, therefore, have a slight leakage whereby the shutter blades 12 are allowed to slowly close so that the shutter will be in closed position while the engine is idle. Immediately upon starting the engine, however, the shutter blades will be open so that air can pass through the radiator to the engine fan.

When it is desired to leave the shutter blades in closed position, it is merely necessary to turn the handle 80 to the off position indicated in Figure 3 whereupon the interior of the cylinder 34 will be in communication with the atmosphere instead of with the tube 70 and the spring 26 will pull the piston 46 outwardly and close the shutter blades.

If it is desired to keep the shutter blades in open position, this can be accomplished by means of the handle 80 in a manner which I will now describe. A hook member 84 is provided on the piston 46. An arm 86 is provided on the valve stem 76. It will be noted by referring to Figure 5 that the arm 86 is out of alignment with the hook 84 when the handle 80 is in on position.

When in off position the hook and the arm are in alignment as illustrated by the arm 86 shown in dotted lines. While the engine is running, the handle 80 may be moved to on position whereupon the piston 46 will move inwardly to the dotted line position shown in Figure 2. The handle 80 is then quickly moved to the off position and the arm 86 engages the hook 84 for holding the shutter blades open. The radiator shutter is maintained in this position during warm weather or when it is desirable to cool the engine off by leaving the shutter blades open while the engine is not running.

To prevent leakage around the valve stem 76, it may be provided with a conical part 88 adapted to fit in a cone seat formed in the boss 38. A spring washer 90 is provided for holding the portion 88 against its seat. Any other type of packing means could be provided to replace the construction just described.

Various changes in constructional details may be made of the parts of my device, without departing from the real spirit and purpose of my invention, and it is my intention to cover by my claims, any modified forms of structure or use of mechanical equivalents, which may be reasonably included within their scope.

I claim as my invention:

1. In a radiator shutter control structure, a cylinder, a piston therein and adapted to be operated by a reduction of air pressure within the cylinder and a manually controlled valve structure for controlling such reduction of pressure, said valve structure serving to support the cylinder and piston relative to an automobile instrument panel.

2. In a radiator shutter control structure, a cylinder, a piston therein and adapted to be operated by a reduction of air pressure within the cylinder and a valve structure for controlling such reduction of pressure, said valve structure including means for engaging the piston for holding it in a predetermined position.

3. In a radiator shutter control structure, a cylinder, a piston therein and adapted to be operated by a reduction of air pressure within the cylinder and a valve structure for controlling such reduction of pressure, said valve structure serving to support the cylinder and piston and including means for engaging the piston for holding it in a predetermined position.

4. In a structure of the class described, a cylinder, a piston therein, said piston being operatively connected with a shutter and a manually controlled valve associated with said cylinder whereby the interior thereof may be selectively connected with a source of pressure or atmosphere.

5. In combination with an engine having a radiator provided with a multi-bladed shutter, a control for said shutter comprising a cylinder, a piston therein and operatively connected with the blades of said shutter, a manually operated valve associated with said cylinder, a connection from said valve to a manifold of said engine, said valve being adapted when in one position, to allow communication between said manifold and the interior of said cylinder.

6. In combination with an engine having a radiator provided with a multi-bladed shutter, a control for said shutter comprising a cylinder, a piston therein and operatively connected with the blades of said shutter, a manually operated valve associated with said cylinder, a connection from said valve to a manifold of said engine, said valve being adapted when in one position, to allow communication between said manifold and the interior of said cylinder and designed to support the cylinder and piston relative to the instrument panel of the engine.

7. In combination with an engine having a radiator provided with a multi-bladed shutter, a control for said shutter comprising a cylinder, a piston therein and operatively connected with the blades of said shutter, a manually operated valve associated with said cylinder, a connection from said valve to a manifold of said engine, said valve being adapted when in one position, to allow communication between said manifold and the interior of said cylinder and designed to support the cylinder and piston relative to the instrument panel of the engine, said valve having an arm thereon and said piston having a hook thereon whereby said arm may be rotated when the piston is in a predetermined position for engaging said hook for retaining said piston in such position.

8. In a controlling device, a cylinder, a valve mounted in the head thereof, a piston in said cylinder and means actuated by operation of said valve for retaining the piston in a predetermined relationship with respect to said cylinder.

9. In a controlling device, a cylinder, a valve mounted in the head thereof, a piston in said cylinder and means actuated by operation of said valve for retaining the piston in a predetermined relationship with respect to said cylinder, said means comprising hook and arm members adapted to coact with each other.

Des Moines, Iowa, May 29, 1928.

BARTLETT R. BENNETT.